United States Patent
Yamamoto et al.

(10) Patent No.: US 12,361,768 B2
(45) Date of Patent: Jul. 15, 2025

(54) IN-VEHICLE DEVICE AND SERVER

(71) Applicant: HITACHI ASTEMO, LTD., Hitachinaka (JP)

(72) Inventors: Naoyuki Yamamoto, Hitachinaka (JP); Hitoshi Kawaguchi, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 245 days.

(21) Appl. No.: 17/909,652

(22) PCT Filed: Dec. 25, 2020

(86) PCT No.: PCT/JP2020/048698
§ 371 (c)(1),
(2) Date: Sep. 6, 2022

(87) PCT Pub. No.: WO2021/181826
PCT Pub. Date: Sep. 16, 2021

(65) Prior Publication Data
US 2023/0115760 A1  Apr. 13, 2023

(30) Foreign Application Priority Data

Mar. 11, 2020  (JP) ................................. 2020-042034

(51) Int. Cl.
*G07C 5/00* (2006.01)
*G07C 5/08* (2006.01)

(52) U.S. Cl.
CPC ........... *G07C 5/008* (2013.01); *G07C 5/0808* (2013.01); *G07C 5/0816* (2013.01)

(58) Field of Classification Search
CPC .... G07C 5/008; G07C 5/0808; G07C 5/0816; G07C 5/0841; G06F 21/55; H04L 9/3226;
(Continued)

(56) References Cited

U.S. PATENT DOCUMENTS

2002/0087237 A1  7/2002 Ol et al.
2005/0017851 A1*  1/2005 Allison .................. G08G 1/017
340/5.1
(Continued)

FOREIGN PATENT DOCUMENTS

EP  3148236 A1 *  3/2017  ............. G06F 21/35
JP  2002-202001 A  7/2002
(Continued)

OTHER PUBLICATIONS

International Search Report with English Translation and Written Opinion of International Application No. PCT/JP2020/048698 mailed Mar. 23, 2021.

(Continued)

*Primary Examiner* — Nga X Nguyen
(74) *Attorney, Agent, or Firm* — Foley & Lardner LLP

(57) ABSTRACT

Provided is an in-vehicle device capable of switching as to whether to make a diagnosis or not when the identification number of the vehicle is not registered in the server. The in-vehicle device 1 includes an OTA center communicating unit 2 (first communication circuit) that establishes wireless communication with an OTA center 300 (server), a memory 1b (first memory) that stores therein diagnosis permission information 4 (first information) indicating diagnosis permitted or diagnosis not permitted, and a CPU 1a (first processor). When the VIN (identification number) of the vehicle 11 having the in-vehicle device 1 onboard is not registered in the OTA center 300 and the diagnosis permission information 4 indicates diagnosis permitted, the CPU 1a makes a diagnosis of the in-vehicle device 1 and stores the result. When the VIN of the vehicle 11 having the in-vehicle device 1 onboard is not registered in the OTA center 300 and the diagnosis permission information 4

(Continued)

indicates diagnosis not permitted, the CPU 1a does not make a diagnosis of the in-vehicle device 1.

8 Claims, 6 Drawing Sheets

(58) Field of Classification Search
CPC ... H04L 2209/84; H04L 63/14; G08G 1/0112; G08G 1/205; G08G 1/017; H04W 12/71; H04W 4/44; H04W 12/088; B60R 25/00
See application file for complete search history.

(56) References Cited

U.S. PATENT DOCUMENTS

| | | | | |
|---|---|---|---|---|
| 2008/0097663 | A1* | 4/2008 | Morimoto | G06Q 30/02 701/31.4 |
| 2009/0281689 | A1* | 11/2009 | Suganuma | G06F 11/006 701/33.4 |
| 2011/0307144 | A1* | 12/2011 | Wu | G07C 5/008 701/1 |

FOREIGN PATENT DOCUMENTS

| | | |
|---|---|---|
| JP | 2009-274472 A | 11/2009 |
| JP | 2010-139514 A | 6/2010 |
| JP | 2017-007379 A | 1/2017 |

OTHER PUBLICATIONS

Extended European Search Report issued in corresponding EP Application No. 20924641.2, dated Feb. 28, 2024 (10 pages).

* cited by examiner

IN-VEHICLE DEVICE AND SERVER

TECHNICAL FIELD

The present invention relates to an in-vehicle device and a server.

BACKGROUND ART

In recent automobiles, accidents caused by security attacks are on the rise in the market, and there have been demands for security measures for vehicles. An example of such security measures includes detections of data frauds.

For example, a possible attack includes a case in which an unauthorized access to the in-vehicle network of a vehicle is made from the outside world, and vehicle identification number information (VIN) stored in the ECU of the vehicle is altered. This is an attack of unauthorized altering of the vehicle identification number information. A possible security countermeasure for a vehicle against such an attack is the use of an in-vehicle device for detecting unauthorized altering of the VIN, storing error information (hereinafter, a diagnostic trouble code (DTC)), and outputting a warning.

The purpose of this warning is to notify and to prompt a user and to visit the automotive dealer. Various methods have been disclosed as a technology for storing the error information in the in-vehicle device (see PTL 1, for example).

CITATION LIST

Patent Literature

PTL 1: JP 2010-139514 A

SUMMARY OF INVENTION

Technical Problem

In recent years, there has been an increasing demand for a remote software updating technology for automobiles (hereinafter, OTA: over-the-air) for updating the ECU software in an automobile remotely by applying a wireless remote software update technology to the automobile. In such an OTA system, the information stored in the OTA center is updated regularly by sending a notification of the latest information, such as the part number, the software version, and the VIN of the ECU that is onboard the vehicle to the OTA center. The purpose of this is to prevent erroneous software updates by synchronizing information stored in the OTA center with that stored on the vehicle.

In addition, by synchronizing these pieces of information, it is possible to detect data discrepancy, in case there is any. In other words, it is possible to use the synchronization of the information also as a function by which the correctness of the data is diagnosed.

By applying such a diagnostic function to detect the presence or absence of unauthorized altering of the VIN described above, the VIN stored in the in-vehicle device can be synchronized to the correct VIN in the OTA center, and, in case when there is any discrepancy in the data, it can be considered that there has been unauthorized altering of the VIN on the in-vehicle device, to store a DTC in the in-vehicle device, and to output a warning.

However, assuming practical use, misdiagnoses described following can be made.

One of such misdiagnoses is that can occur when the power of a vehicle is turned ON and communication with the OTA center is established before a VIN is written to the vehicle in a vehicle assembly factory. A VIN mismatch will then be detected and a DTC will be stored.

The other case is a misdiagnosis that can occur even after a VIN is written to the vehicle. If the power of the vehicle is turned ON before the VIN is registered in the VIN information management in the OTA center, VIN unregistered will be detected and a DTC will be stored in the same manner.

An object of the present invention is to provide an in-vehicle device capable of detecting unauthorized altering of a VIN without making any erroneous diagnoses even before the VIN is written to the vehicle or even before the VIN of the vehicle is registered to the server, as described above.

Solution to Problem

In order to achieve the above object, according to an example of the present invention, an in-vehicle device includes: a first communication circuit that establishes wireless communication with a server; a first memory that stores therein first information indicating diagnosis permitted or diagnosis not permitted; and a first processor, wherein the first processor makes a diagnosis of the in-vehicle device and stores therein a result when an identification number of a vehicle having the in-vehicle device onboard is not registered in the server and the first information indicates diagnosis permitted, and does not make a diagnosis of the in-vehicle device when the identification number of the vehicle having the in-vehicle device onboard is not registered in the server and the first information indicates diagnosis not permitted.

Advantageous Effects of Invention

According to the present invention, it is possible to switch as to whether to make a diagnosis or not when the identification number of the vehicle is not registered in the server. Problems, configurations, and effects other than those described above will be clarified by the following description of embodiments.

DESCRIPTION OF EMBODIMENTS

Figure 1:
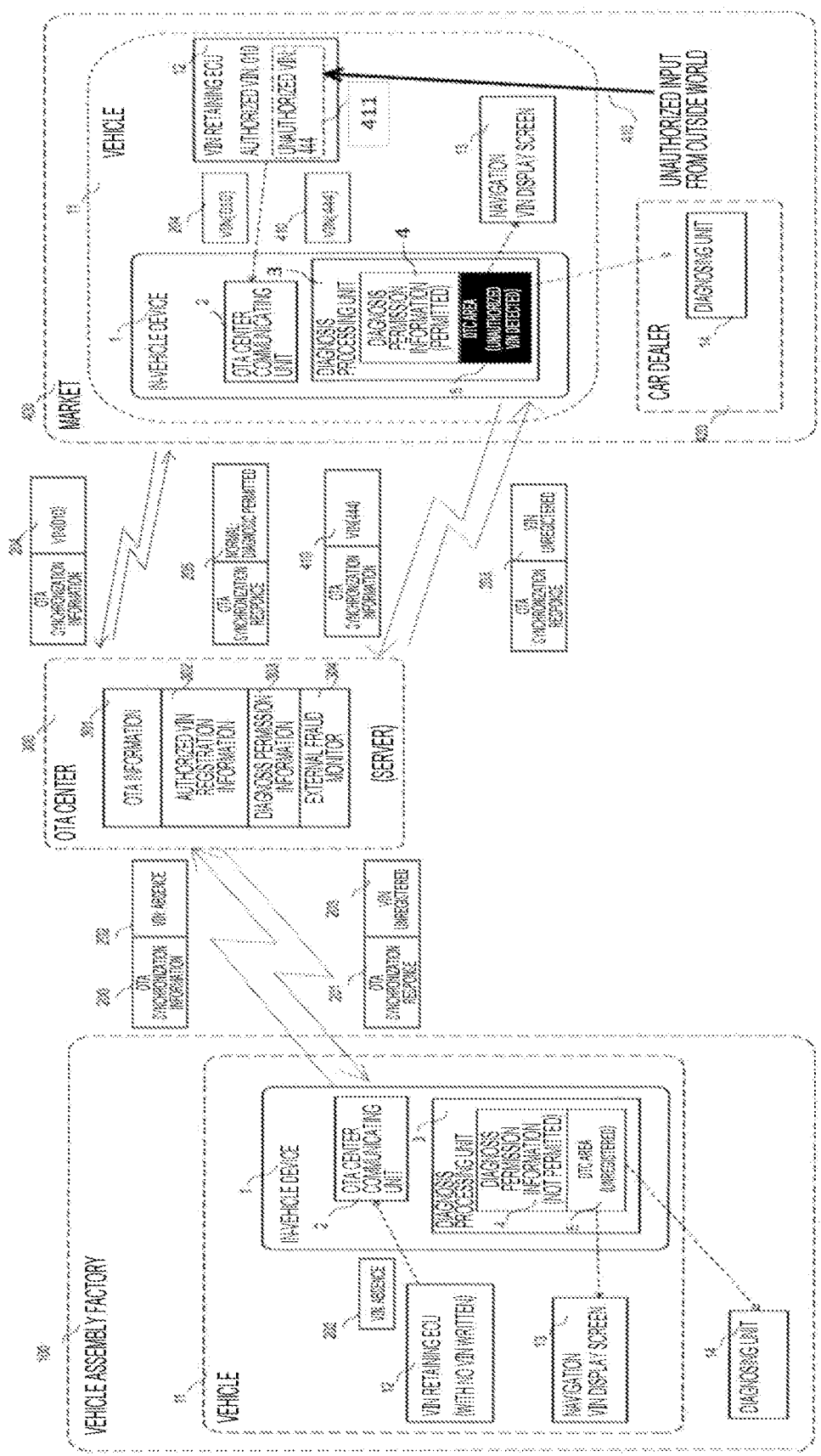
FIG. 1 is a schematic configuration diagram of an in-vehicle device and an in-vehicle system according to an embodiment of the present invention.

An in-vehicle device and an OTA system according to an embodiment of the present invention will now be explained with reference to FIGS. 1 to 4, among the accompanying drawings.

General configurations of the in-vehicle device and an in-vehicle system according to the embodiment of the present invention will be now explained with reference to FIG. 1.

(General Configurations)

An in-vehicle device 1 is a device capable of communicating with a VIN retaining ECU 12, a navigation VIN screen display 13, a diagnosing unit 14, and an OTA center 300, and includes, for example, an OTA center communicating unit 2, a diagnosis processing unit 3, a diagnosis permission information 4, and a DTC area 5. The in-vehicle device 1 transmits OTA synchronization information 200 to the OTA center 300, and receives an OTA synchronization response 201 from the OTA center 300. Such in-vehicle devices 1 are installed in vehicles 11 in a vehicle assembly factory (100) and a market (400).

Components in the vehicle assembly factory (100) include the vehicle 11 and the diagnosing unit 14. Note that the diagnosing unit 14 is, for example, a laptop computer in which a tool (software) for displaying a result of a diagnosis of the in-vehicle device 1 is installed, for example. The diagnosing unit 14 is also installed in a car dealer 420 in the market (400).

The OTA center (300) is capable of communicating with the in-vehicle device 1, and components of which include OTA information 301, authorized VIN registration information 302, diagnosis permission information 303, and external fraud monitor 304, for example. The OTA center (300) receives the OTA synchronization information 200 from the in-vehicle device 1 and transmits the OTA synchronization response 201 to the in-vehicle device 1.

Components of the market (400) include, for example, the vehicle 11, the car dealer 420, and an unauthorized input 410 from the outside world.

(Hardware Configurations)

Figure 5:
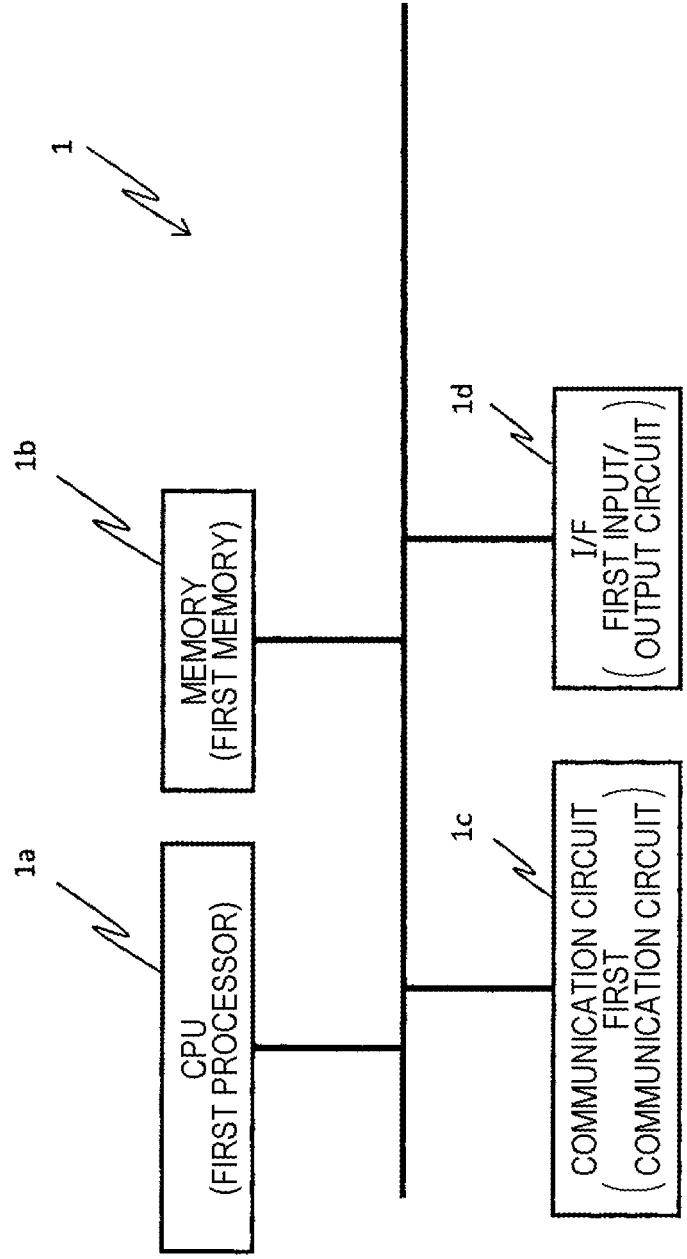
FIG. 5 is a schematic illustrating a hardware configuration of the in-vehicle device.

The in-vehicle device 1 is, for example, an electronic control unit (ECU). As illustrated in FIG. 5, the in-vehicle device 1 includes a CPU 1a (first processor), a memory 1b (first memory), a communication circuit 1c (first communication circuit), an I/F 1d (input/output circuit). The CPU 1a illustrated in FIG. 5 functions as the diagnosis processing unit 3 illustrated in FIG. 1, and the communication circuit 1c illustrated in FIG. 5 functions as the OTA center communicating unit 2 illustrated in FIG. 1.

Figure 6:
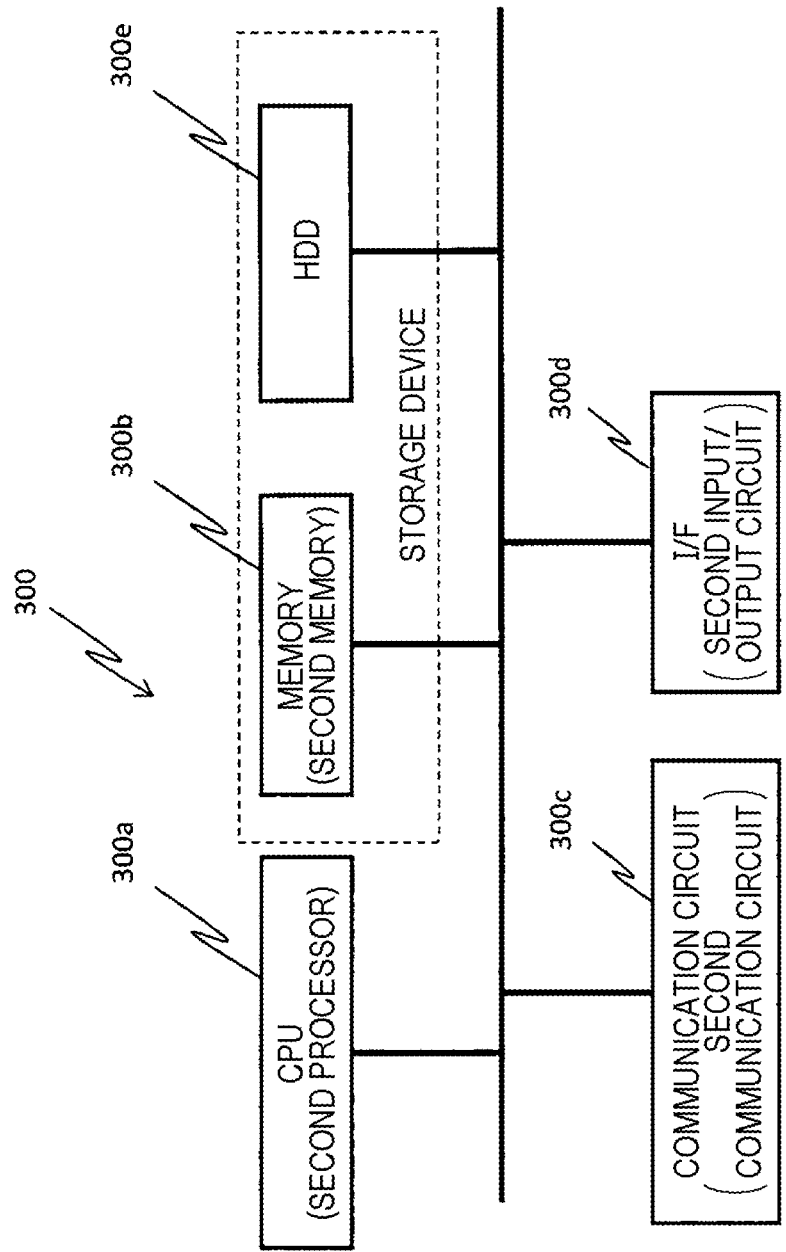
FIG. 6 is a schematic illustrating a hardware configuration of the OTA center (server).

The OTA center 300 is, for example, a server. As illustrated in FIG. 6, the OTA center 300 includes a CPU 300a (second processor), a memory 300b (second memory), a communication circuit 300c (second communication circuit), an I/F 300d (second input/output circuit), a hard-disk drive (HDD), and the like. The CPU 1a illustrated in FIG. 5 functions as the diagnosis processing unit 3 illustrated in FIG. 1, and the communication circuit 1c illustrated in FIG. 5 functions as an external fraud monitor 304 illustrated in FIG. 1.

(Synchronization Between Vehicle Assembly Factory and OTA Center)

In the vehicle assembly factory (100), as a process of assembling the vehicle 11, the in-vehicle device 1, the VIN retaining ECU 12, and the navigation VIN screen display 13 are connected to one another. When the power of the vehicle 11 is turned ON after the assembly, the in-vehicle device 1 receives VIN absence 202 from the VIN retaining ECU 12, puts the VIN absence 202 in the OTA synchronization information 200, and transmits the result to the OTA center 300 via the OTA center communicating unit 2. The VIN absence 202 herein is data indicating that VIN is empty or null, for example.

Figure 3:
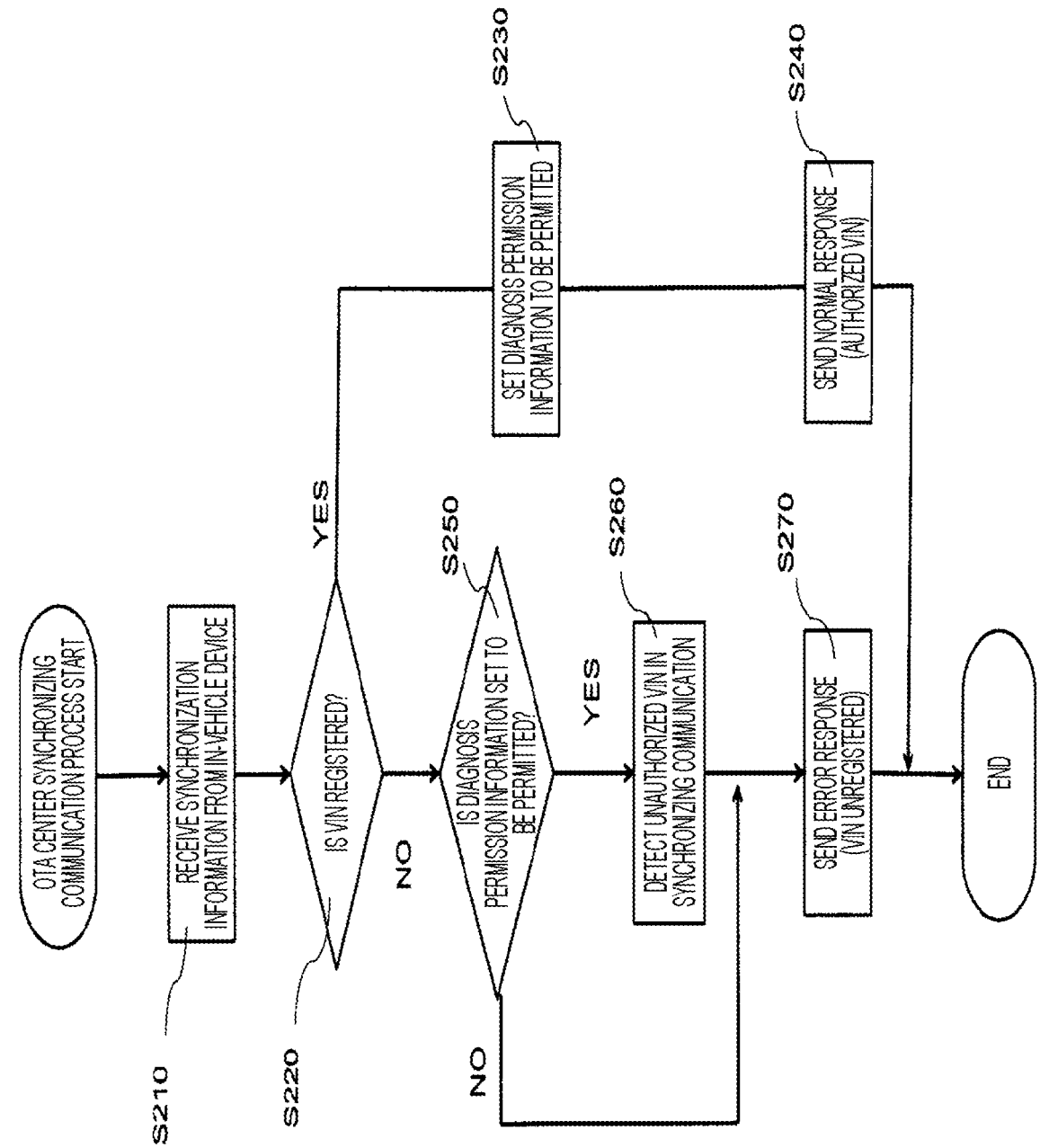
FIG. 3 is a flowchart of a process from receiving the OTA synchronization information and responding with diagnosis permitted, in an OTA center.

As illustrated in FIG. 3, the OTA center 300 receives the VIN absence 202 in the OTA synchronization information 200 (S210), determines whether the information matches the authorized VIN registration information 302 (S220). If the information does not match the authorized VIN information (S220: NO), because the diagnosis permission information 303 is set to diagnosis not permitted (initial value) (S250: NO), the OTA center includes VIN unregistered 203 representing an error in the OTA synchronization response and sends the response (S270).

Figure 2:
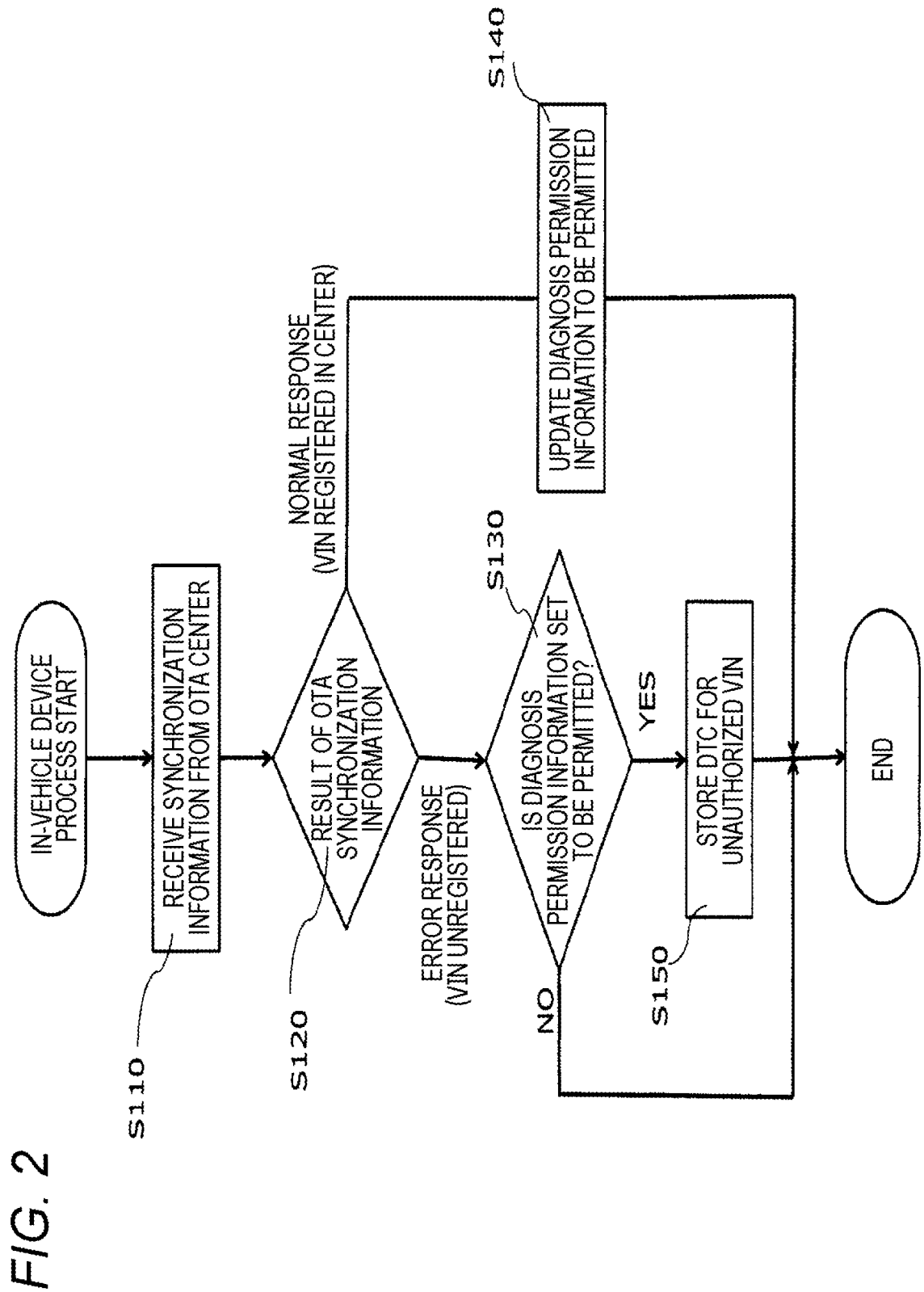
FIG. 2 is a flowchart of a process from transmitting OTA synchronization information to determining whether a diagnosis is permitted, in the in-vehicle device according to the embodiment of the present invention.

As illustrated in FIG. 2, the in-vehicle device 1 in the vehicle assembly factory (100) receives the response with the VIN unregistered 203 (S110). Because the OTA synchronization response is an error response (VIN non-registration) (S120), and because the diagnosis permission information 4 is set to diagnosis not permitted (initial value) (S130: NO), a diagnosis of the VIN is not performed (S130: NO).

Figure 4:
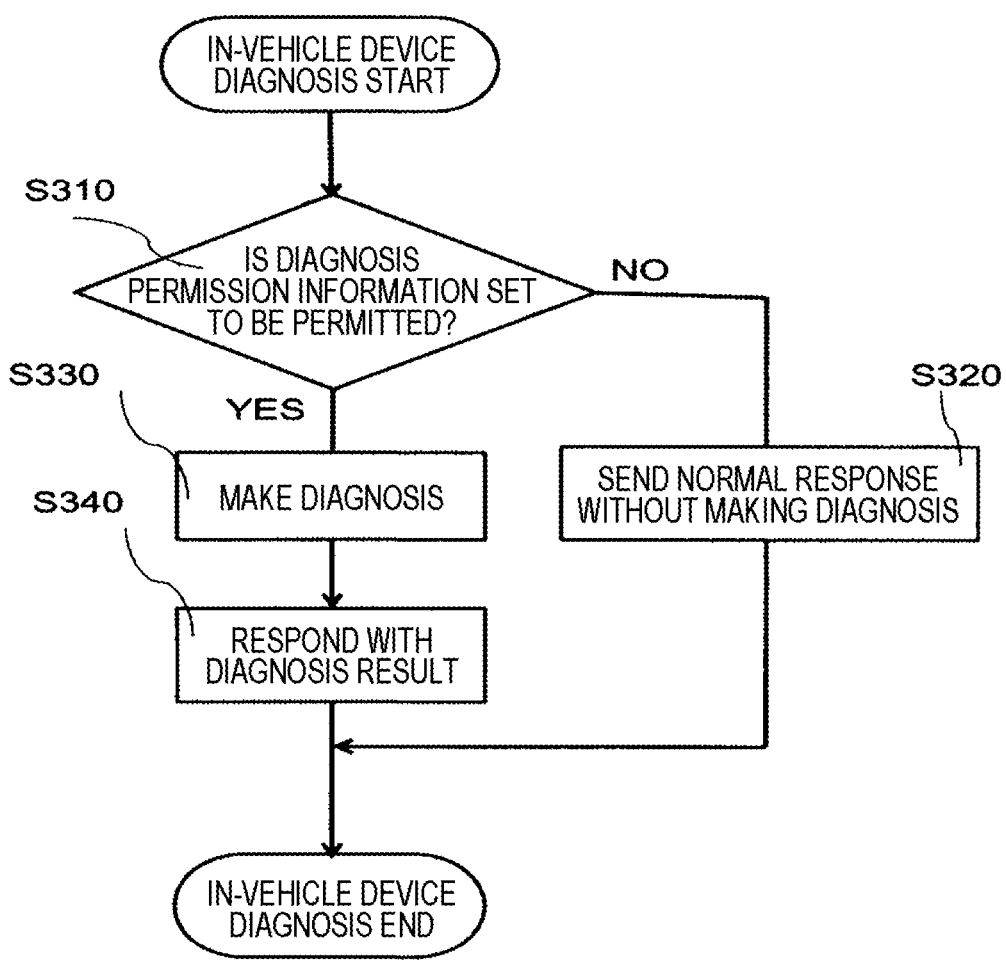
FIG. 4 is a flowchart of a process from starting a diagnosis to ending the diagnosis in the in-vehicle device according to the embodiment of the present invention.

As illustrated in FIG. 4, if the diagnosis permission information 4 is set to diagnosis not permitted (S310: NO), the in-vehicle device 1 in the vehicle assembly factory (100) does not make a diagnosis of the VIN, but responds with a normal diagnosis result to the navigation VIN screen display 13 and the diagnosing unit 14 (S320).

In other words, the in-vehicle device 1 includes the OTA center communicating unit 2 (first communication circuit) that establishes wireless communication with the OTA center 300 (server), the memory 1b (first memory) that stores therein the diagnosis permission information 4 (first information) indicating diagnosis permitted or diagnosis not permitted, and the CPU 1a (first processor). If no VIN (identification number) of the vehicle 11 having the in-vehicle device 1 onboard is not registered in the OTA center 300 (server) and if the diagnosis permission information 4 indicates diagnosis not permitted, the in-vehicle device 1 is not diagnosed.

In this embodiment, the memory 1b (first memory) stores therein diagnosis permission information 4 (first information) indicating diagnosis not permitted as an initial value. As a result, for example, when the power of the in-vehicle device 1 is turned ON in the factory or the like, no diagnosis is performed even if the VIN (identification number) of the vehicle 11 is not registered in the OTA center 300 (server).

As illustrated in FIG. 1, the in-vehicle device 1 in the market 400 receives the authorized VIN (010) 204 from the VIN retaining ECU 12, and transmits the OTA synchronization information 200 including the authorized VIN (010) 204 to the OTA center 300 via the OTA center communicating unit 2.

As illustrated in FIG. 3, the OTA center 300 receives the authorized VIN (010) 204 in the OTA synchronization information 200 (S210), determines whether the information matches the authorized VIN registration information 302 (S220), rewrites the diagnosis permission information 303 to the diagnosis permitted (S230) because the information is the authorized VIN information (S220: YES), sets the OTA synchronization response 201 to normal, includes the diagnosis permitted 205 in the diagnosis permission information 303, and sends the response (S240).

In other words, the OTA center 300 (server) includes the communication circuit 300c (second communication circuit)

that establishes wireless communication with the in-vehicle device 1, and the CPU 300a (second processor). The CPU 300a (second processor) receives the VIN (identification number) of the vehicle 11 from the in-vehicle device 1 via the communication circuit 300c (second communication circuit), determines whether the VIN of the vehicle 11 is registered in the HDD 300 or the like in the OTA center 300 (server), and, if it is determined that the VIN of the vehicle 11 is registered in the OTA center 300, transmits diagnosis permission information 303 (second information) indicating diagnosis permitted, to the in-vehicle device 1 via the communication circuit 300c (second communication circuit).

As a result, when it is determined that the VIN (identification number) of the vehicle 11 is registered in the OTA center 300 (server), the OTA center 300 can set diagnosis permission information 4 (initial value of the first information) having been indicating diagnosis not permitted to diagnosis permitted, via the diagnosis permission information 303 (second information).

In this embodiment, only the first time it is determined that the VIN (identification number) of the vehicle 11 is registered in the OTA center 300 (server), the CPU 300a (second processor) transmits the diagnosis permission information 303 (second information) indicating diagnosis permitted to the in-vehicle device 1 via the communication circuit 300c (second communication circuit).

As a result, only the first time it is determined that the VIN of the vehicle is registered in the OTA center 300, the OTA center 300 can set the diagnosis permission information 4 (the initial value of the first information) indicating diagnosis not permitted to diagnosis permitted, via the diagnosis permission information 303 (the second information).

Specifically, the OTA center 300 (server) includes the memory 300b (second memory) that stores therein the diagnosis permission information 303 (second information) indicating diagnosis not permitted as the initial value. When the VIN (identification number) of the vehicle 11 is determined to be registered in the OTA center 300 (server) and the diagnosis permission information 303 (second information) in the memory 300b (second memory) indicates diagnosis not permitted, the CPU 300a (second processor) rewrites the diagnosis permission information 303 in the memory 300b so as to indicate diagnosis permitted, and transmits the diagnosis permission information 303 indicating diagnosis permitted to the in-vehicle device 1 via the communication circuit 300c (second communication circuit).

As a result, only the first time it is determined that the VIN (identification number) of the vehicle 11 is registered in the OTA center 300 (server), the OTA center 300 (server) can set diagnosis permission information 4 (initial value of the first information) indicating diagnosis not permitted to diagnosis permitted, via the diagnosis permission information 303 (second information). It is also possible to synchronize the diagnosis permission information 4 (first information) in the memory 1b (first memory) with the diagnosis permission information 303 (second information) in the memory 300b (second memory).

The CPU 300a (second processor) may count the number of times the VIN (identification number) of the vehicle 11 is determined to be registered in the OTA center 300 (server), and, when the count is incremented from 0 to 1, transmit the diagnosis permission information 303 (second information) indicating diagnosis permitted to the in-vehicle device 1 via the communication circuit 300c (second communication circuit).

As a result, only the first time it is determined that the VIN (identification number) of the vehicle 11 is registered in the OTA center 300 (server), the OTA center 300 (server) can set diagnosis permission information 4 (initial value of the first information) indicating diagnosis not permitted to diagnosis permitted, via the diagnosis permission information 303 (second information).

As illustrated in FIG. 2, the in-vehicle device 1 in the market 400 receives the diagnosis permitted 205 in the OTA synchronization response 201 (S110). Because the OTA synchronization response 201 is a normal response (VIN is registered in the center) (S120), the diagnosis processing unit 3 sets the diagnosis permission information 4 as diagnosis permitted (S140) to permit a diagnosis of the VIN.

In this embodiment, the CPU 1a (first processor) in the in-vehicle device 1 transmits the VIN (identification number) of the vehicle 11 to the OTA center 300 (server) via the OTA center communicating unit 2 (first communication circuit). When it is determined that the VIN of the vehicle 11 is registered in the OTA center 300, the CPU 1a receives the diagnosis permission information 303 (second information) indicating diagnosis permitted, from the OTA center 300 via the OTA center communicating unit 2, and rewrites the diagnosis permission information 4 (first information) in the memory 1b (first memory) so as to match the diagnosis permission information 303 (second information).

With this, when it is determined that the VIN (identification number) of the vehicle 11 is registered in the OTA center 300 (server), it is possible to set the diagnosis permission information 4 (first information) to indicate diagnosis permitted, via the diagnosis permission information 303 (second information). As a result, a diagnosis is permitted when a VIN is assigned to the vehicle 11 and the VIN of the vehicle 11 is registered in the OTA center 300, for example.

As illustrated in FIG. 1, if VIN is altered by the unauthorized input 410 from the outside of the VIN retaining ECU 12 in the market 400 after the diagnosis is permitted, the in-vehicle device 1 receives, after the vehicle is powered ON, unauthorized VIN (444) 411 from the VIN retaining ECU 12, and transmits the OTA synchronization information 200 including the unauthorized VIN (444) 411 to the OTA center 300 via the OTA center communicating unit 2.

As illustrated in FIG. 3, the OTA center 300 receives the unauthorized VIN (444) 411 in the OTA synchronization information 200 (S210), and determines whether the information matches the authorized VIN registration information 302 (S220). Because the diagnosis permission information 303 is set to diagnosis permitted (S250: YES), the OTA center 300 detects that it is the unauthorized VIN information (S260), and responds with the OTA synchronization response 201 including VIN unregistered 203 indicating an error (S270).

In other words, when it is determined that the VIN (identification number) of the vehicle 11 is not registered in the OTA center 300 (server) and the diagnosis permission information 303 (second information) in the memory 300b (second memory) indicates diagnosis permitted, the CPU 300a (second processor) determines that there has been unauthorized altering of the VIN on the vehicle 11. In this manner, the OTA center 300 (server) can detect the unauthorized altering of the VIN (identification number) on the vehicle 11.

As illustrated in FIG. 2, the in-vehicle device 1 in the market 400 receives the VIN unregistered 203 in the OTA synchronization response 201 (S110). Because the OTA synchronization response 201 is an error response (VIN unregistered) (S120) and the diagnosis permission information 4 indicates diagnosis permitted in the diagnosis processing unit 3 (S130: YES), the DTC is stored as a detection of an unauthorized VIN (S150). As illustrated in FIG. 4, because the diagnosis permission information 4 indicates diagnosis permitted (S310: YES), the VIN is diagnosed (S330), and the in-vehicle device 1 in the market 400 outputs an error diagnosis result to the navigation VIN screen display 13 and the diagnosing unit 14.

In other words, when the VIN (identification number) of the vehicle 11 having the in-vehicle device 1 onboard is not registered in the OTA center 300 (server) and the diagnosis permission information 4 (first information) indicates diagnosis permitted, the CPU 1a (first processor) makes a diagnosis of the in-vehicle device 1, and stores the result in the memory, for example.

In this manner, it is possible to switch as to whether to perform a diagnosis or not based on the diagnosis permission information 4 (first information) when the VIN (identification number) of the vehicle 11 is not registered in the OTA center 300 (server). For example, when the VIN of the vehicle 11 is not registered in the OTA center 300 because the vehicle 11 has not been assigned with a VIN, by setting the diagnosis permission information 4 to indicate diagnosis not permitted, a diagnosis is avoided. By contrast, by setting the diagnosis permission information 4 to indicate diagnosis permitted, when the VIN of the vehicle 11 is not registered in the OTA center 300 due to the altering of the VIN on the vehicle 11, a diagnosis is performed.

In this embodiment, when the VIN (identification number) of the vehicle 11 is not registered in the OTA center 300 (server) and the diagnosis permission information 4 (first information) indicates diagnosis permitted, the CPU 1a (first processor) makes a diagnosis based on a standard of the in-vehicle device 1 (e.g., the On-Board Diagnosis Second Generation (OBD 2)) and stores a failure code (e.g., Diagnostic Trouble Code (DTC)) corresponding to the result in the memory, for example.

As a result, by setting the diagnosis permission information 4 (first information) to indicate diagnosis permitted, when the VIN of the vehicle 11 is not registered in the OTA center 300 (server) because the VIN (identification number) of the vehicle 11 has been altered, a diagnosis conforming to the standard of the in-vehicle device 1 is performed and a failure code corresponding to the result is stored.

Furthermore, when the VIN (identification number) of the vehicle 11 is not registered in the OTA center 300 (server) and the diagnosis permission information 4 (first information) indicates diagnosis permitted, the CPU 1a (first processor) determines that there has been unauthorized altering of the VIN on the vehicle 11. In this manner, the in-vehicle device 1 can detect that there has been unauthorized altering of the VIN on the vehicle.

In the manner described above, according to this embodiment, it is possible to switch as to whether to perform a diagnosis or not when the VIN (identification number) of the vehicle is not registered in the OTA center 300 (server).

Note that the present invention is not limited to the above-described embodiment and includes various modifications. For example, the embodiment has been described above in detail to facilitate understanding of the present invention, and is not necessarily limited to the configuration including all of the elements described above. Furthermore, a part of the configuration according to one embodiment can be replaced with a configuration according to another embodiment, and a configuration according to another embodiment can be added to the configuration of the one embodiment. In addition, another configuration may be added to, deleted from, and replaced with a part of the configuration according to each of the embodiments.

In the embodiment described above, the VIN retaining ECU 12 and the in-vehicle device 1 are separate units, but may be integrated.

In addition, some or all of the configurations, functions, and the like described above may be implemented as hardware, by designing with an integrated circuit, for example. In addition, each of the configurations, functions, and the like described above may be implemented as software by causing a processor to parse and to execute a computer program for implementing the corresponding function. Information such as a program, a table, and a file for implementing each of the functions may be stored in a recording device such as a memory, a hard disk, and a solid state drive (SSD), or a recording medium such as an IC card, an SD card, and a DVD.

The embodiment of the present invention may be configured in the following manner.

(1) An in-vehicle device comprising: an over-the-air (OTA) center that makes an operation on vehicle identification number information (VIN); an OTA center; and synchronization information, wherein appropriateness of a diagnosis of the VIN is determined from the synchronization information, based on diagnosis permission information.

(2) In (1), when synchronization with the OTA center does not succeed, the diagnosis permission information is set to not permitted based on a determination by the OTA center, so that the diagnosis is not performed. The in-vehicle device then causes the diagnosing unit to read the diagnosis permission information and to check a VIN operation performed by the OTA center.

(3) In (1), when synchronization with the OTA center succeeds, the in-vehicle device sets the diagnosis permission information to be permitted based on a determination of the OTA center, and after the synchronization with the OTA center is established, makes a diagnosis of the VIN based on the diagnosis permission information and on a determination of the OTA center.

(4) In (1), it is possible to detect an attack from the outside based on the diagnosis permission information, simultaneously with the OTA center.

(5) In (1), for the diagnosis permission information, a synchronization counter may be used to further increase the accuracy.

(6) In (1), the diagnosing unit is enabled to check a detection of an attack from the outside, and to check and to rewrite the diagnosis permission information.

(7) The OTA center is enabled to make an operation on the diagnostic information permission in the in-vehicle device based on the synchronization information.

(8) The OTA center is enabled to detect an attack from the outside of the in-vehicle device based on the synchronization information.

With the in-vehicle devices according to any one of (1) to (8), the in-vehicle device does not make a diagnosis in the vehicle assembly factory until the OTA center registers an authorized VIN. Because the in-vehicle device does not perform the diagnosis, the DTC for an unauthorized VIN is not stored.

By contrast, in the market, the in-vehicle device can make a diagnosis as to whether a VIN is an unauthorized VIN and the authorized VIN, based on content where the authorized VIN information is registered in the OTA center. Furthermore, because synchronous communication is periodically established with the OTA center, a failure diagnosis for a detection of an unauthorized VIN can be made at the stage at which a cyberattack from the outside world is received.

The OTA center can detect an attack from the outside world at the same timing as the in-vehicle device onboard a vehicle managed by the center, and can operate the diagnosis permission information of the vehicle remotely.

REFERENCE SIGNS LIST 1 in-vehicle device
2 OTA center communicating unit
3 diagnosis processing unit
4 diagnosis permission information
5 DTC area
11 vehicle
12 VIN retaining ECU
13 navigation VIN screen display
14 diagnosing unit
100 vehicle assembly factory
200 OTA synchronization information
201 OTA synchronization response
202 VIN absence
203 VIN unregistered
204 authorized VIN (010)
205 diagnosis permitted
300 OTA center
301 OTA information
302 authorized VIN registration information
303 diagnosis permission information
304 external fraud monitor
400 market
410 unauthorized input from outside world
411 unauthorized VIN (444)
420 car dealer

The invention claimed is:

1. An in-vehicle device comprising:
a first communication circuit that establishes wireless communication with a server;
a first memory that stores therein first information indicating whether to permit diagnosis; and
a first processor configured to:
determine whether an identification number of a vehicle having the in-vehicle device onboard is registered in the server or not, by:
transmitting the identification number of the vehicle to the server via the first communication circuit;
receiving, when it is determined that the identification number of the vehicle is registered in the server, second information indicating diagnosis permitted from the server via the first communication circuit; and
rewriting the first information in the first memory so as to match the second information;
in response to a determination that the identification number is registered, update the first information to indicate that the diagnosis is permitted; and
in response to a determination that the identification number is not registered,
(i) diagnose the in-vehicle device and store a result in the first memory, by making the diagnosis that conforms to a standard of the in-vehicle device, and store a failure code corresponding to the result of the diagnosis, when the first information indicates the diagnosis is permitted, or
(ii) not diagnose the in-vehicle device when the first information indicates the diagnosis is not permitted wherein the first memory stores therein the first information indicating diagnosis not permitted as an initial value.

2. The in-vehicle device according to claim 1, wherein, when the identification number of the vehicle is not registered in the server and the first information indicates diagnosis permitted, the first processor determines that there has been unauthorized altering of the identification number on the vehicle.

3. A server that communicates with the in-vehicle device according to claim 1, the server comprising:
a second communication circuit that establishes wireless communication with the in-vehicle device; and
a second processor,
wherein the second processor
receives the identification number of the vehicle from the in-vehicle device via the second communication circuit;
determines whether the identification number of the vehicle is registered in the server; and
transmits, when it is determined that the identification number of the vehicle is registered in the server, the second information indicating diagnosis permitted to the in-vehicle device via the second communication circuit.

4. The server according to claim 3, wherein the second processor transmits the second information indicating diagnosis permitted to the in-vehicle device via the second communication circuit, only first time it is determined that the identification number of the vehicle is registered in the server.

5. The server according to claim 3, further comprising a second memory that stores therein the second information indicating diagnosis not permitted as an initial value,
wherein the second processor
rewrites the second information in the second memory to indicate diagnosis permitted when it is determined that the identification number of the vehicle is registered in the server and the second information in the second memory indicates diagnosis not permitted, and
transmits the second information indicating diagnosis permitted to the in-vehicle device via the second communication circuit.

6. The server according to claim 3, wherein the second processor counts number of times it is determined that the identification number of the vehicle is registered in the server, and transmits the second information indicating diagnosis permitted to the in-vehicle device via the second communication circuit when the counted number of times is incremented from 0 to 1.

7. The server according to claim 5, wherein, when it is determined that the identification number of the vehicle is not registered in the server and the second information in the second memory indicates diagnosis permitted, the second processor determines that there has been unauthorized altering of the identification number on the vehicle.

8. An in-vehicle device comprising:
a first communication circuit that establishes wireless communication with a server;
a first memory that stores therein first information indicating whether to permit diagnosis; and
a first processor configured to:
determine whether an identification number of a vehicle having the in-vehicle device onboard is registered in the server or not, by:

transmitting the identification number of the vehicle to the server via the first communication circuit;

receiving, when it is determined that the identification number of the vehicle is registered in the server, second information indicating diagnosis permitted from the server via the first communication circuit; and rewriting the first information in the first memory so as to match the second information;

in response to a determination that the identification number is registered, update the first information to indicate that the diagnosis is permitted; and in response to a determination that the identification number is not registered,
  (i) diagnose the in-vehicle device and store a result in the first memory and determine that there has been unauthorized altering of the identification number on the vehicle, when the first information indicates the diagnosis is permitted, or
  (ii) not diagnose the in-vehicle device when the first information indicates the diagnosis is not permitted wherein the first memory stores therein the first information indicating diagnosis not permitted as an initial value.

\* \* \* \* \*